No. 798,740. PATENTED SEPT. 5, 1905.
J. I. MAGUIRE.
WHEEL.
APPLICATION FILED MAY 10, 1905.

UNITED STATES PATENT OFFICE.

JOHN I. MAGUIRE, OF WAYNE, PENNSYLVANIA.

WHEEL.

No. 798,740. Specification of Letters Patent. Patented Sept. 5, 1905.

Application filed May 10, 1905. Serial No. 259,671.

*To all whom it may concern:*

Be it known that I, JOHN I. MAGUIRE, a citizen of the United States, residing at Wayne, in the county of Delaware and State of Pennsylvania, have invented certain new and useful Improvements in Wheels, of which the following is a specification.

My invention has relation to improvements in wheels for vehicles, and in such connection it relates to the general construction and arrangement of such wheels.

Hitherto wheels have been designed solid to be driven either by an axle or other means when the wheels were mounted loosely on the axle or shaft. Such wheels when employed on automobiles as rear or driving wheels required special mechanism to permit the wheels driven with equal speed to turn with unequal speed in passing round corners or in the movement of the vehicles in curves to overcome so-called "skidding" or the turning of one of the wheels, which in such movements describe or move in a smaller curve. Furthermore, in instances where the motor of such a vehicle becomes unmanageable and incapable of being stopped the wheels positively driven by the motor could not be prevented from rotation by the application of a brake without destruction of the same. Neither could the wheels in the case of an accident be suddenly stopped by the brake without causing overturning of the vehicle.

The principal objects of my invention are, therefore, to overcome the above-mentioned disadvantages and to provide a wheel formed of disconnected sections concentrically arranged with respect to each other which under normal conditions permit of the driving of the wheel by engaging and positively turning one of its sections, while under abnormal conditions permit of the free turning of one section within the other.

The nature and characteristic features of my invention will be more fully understood from the following description, taken in connection with the accompanying drawings, forming part hereof, in which—

Figure 1:
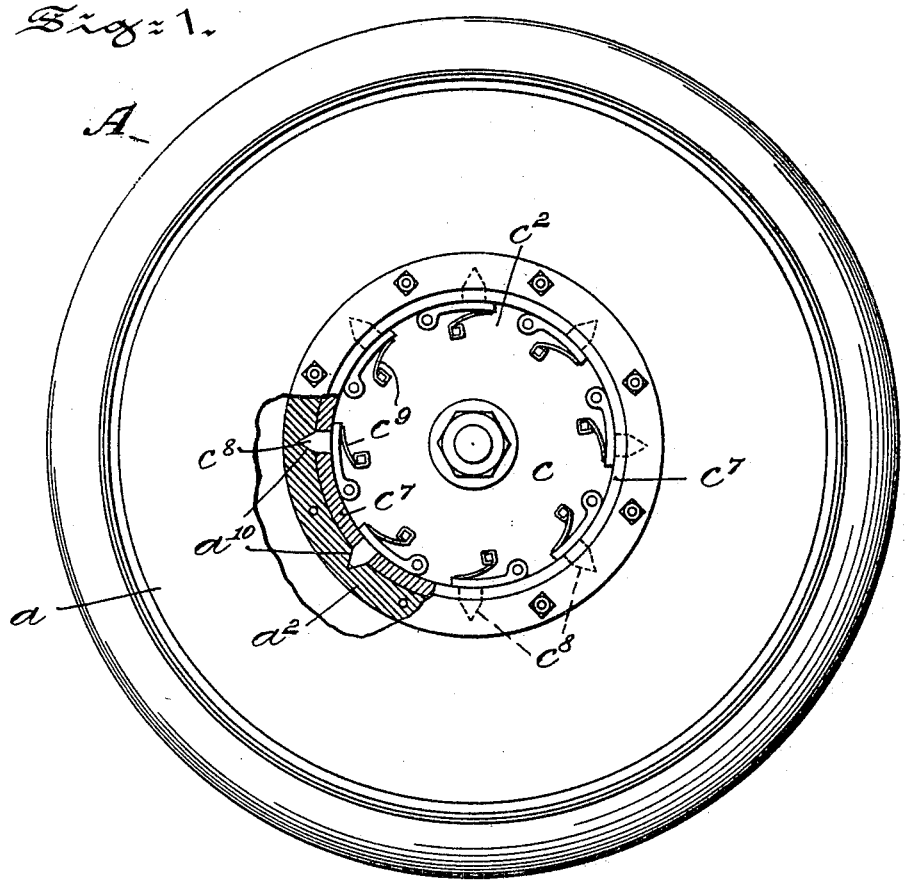
Figure 2:
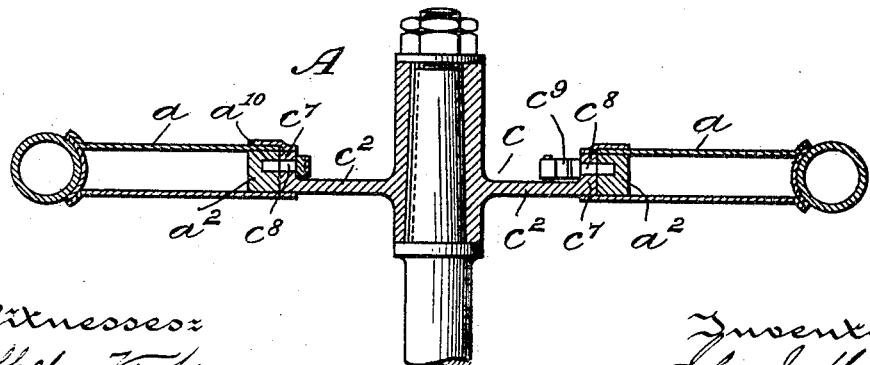

Figure 1 is a side elevational view of a wheel embodying main features of my invention, having a certain portion thereof broken away; and Fig. 2 is a cross-sectional view thereof.

Referring to the drawings, A represents a wheel consisting of inner and outer sections $a$ and $c$, the inner section being provided with a hub extension $c^3$, having a rectangular flange $c^7$ bearing against a ring $a^2$ of the outer section $a$ and snugly fitting therein. The sections $a$ and $c$ are loosely connected with each other by preferably tapered pawls $c^8$, passing through the flange $c^7$ and engaging correspondingly-shaped pockets or depressions $a^{10}$ of the said ring $a^2$. These pawls are held in engagement with the said ring $a^2$ by means of springs $c^9$ as long as the outer section is not subject to undue strain caused by a brake or by the sliding of the outer section over a road-bed under the influence of the inner section $c$. In this instance the pawls $c^8$ by the intervention of their inclined surfaces will be forced out of the pockets $a^{10}$ against the tension of the springs $c^9$, and thus permit the inner section $c$ to freely slide within the outer section $a$.

Having thus described the nature and object of my invention, what I claim as new, and desire to secure by Letters Patent, is—

1. A wheel, consisting of inner and outer sections, whereof the inner one is provided with a hub extension having a flange bearing against a ring of the outer section, pockets or depressions in said ring and pawls passing through said flange and adapted to engage the pockets or depressions of said ring, substantially as and for the purposes described.

2. A wheel, consisting of inner and outer sections, whereof the inner one is provided with a hub extension having a rectangular-shape flange bearing against a ring of the outer section, pockets or depressions in said ring and spring-actuated pawls passing through the flange of said outer section and adapted to engage the pockets or depressions of said ring, substantially as and for the purposes described.

In testimony whereof I have hereunto set my signature in the presence of two subscribing witnesses.

JOHN I. MAGUIRE.

Witnesses:
J. WALTER DOUGLASS,
THOMAS M. SMITH.